United States Patent
Ricketts

(10) Patent No.: US 11,116,137 B2
(45) Date of Patent: Sep. 14, 2021

(54) CONCAVE RAMP FOR AN AGRICULTURAL VEHICLE

(71) Applicant: CNH Industrial America LLC, New Holland, PA (US)

(72) Inventor: Jonathan E. Ricketts, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/046,525

(22) PCT Filed: Apr. 9, 2019

(86) PCT No.: PCT/US2019/026667
§ 371 (c)(1),
(2) Date: Oct. 9, 2020

(87) PCT Pub. No.: WO2019/199889
PCT Pub. Date: Oct. 17, 2019

(65) Prior Publication Data
US 2021/0051853 A1    Feb. 25, 2021

Related U.S. Application Data

(60) Provisional application No. 62/656,640, filed on Apr. 12, 2018.

(51) Int. Cl.
*A01F 12/26*    (2006.01)
*A01F 12/28*    (2006.01)
(Continued)

(52) U.S. Cl.
CPC .............. *A01F 12/26* (2013.01); *A01F 7/067* (2013.01); *A01F 12/10* (2013.01); *A01F 12/28* (2013.01); *A01F 7/065* (2013.01)

(58) Field of Classification Search
CPC .......... A01F 12/26; A01F 12/28; A01F 7/065; A01F 7/067; A01F 12/10
(Continued)

(56) References Cited

U.S. PATENT DOCUMENTS

| 2,230,329 A | 2/1941 | Livermon |
| 4,328,815 A | 5/1982 | Rowland-Hill |

(Continued)

FOREIGN PATENT DOCUMENTS

| DE | 3048252 A1 | 11/1982 |
| GB | 2033203 A | 5/1980 |
| WO | 413993 A | 10/1889 |

OTHER PUBLICATIONS

International Search Report and Written Opinion for Application No. PCT/US2019/026667 dated Jul. 10, 2019 (11 pages).

*Primary Examiner* — Alicia Torres
(74) *Attorney, Agent, or Firm* — Peter Zacharias; Patrick Sheldrake

(57) ABSTRACT

An agricultural vehicle including a chassis and a threshing system supported by the chassis. The threshing system includes a rotor, a front concave located at a distance radially away from the rotor and at least partially surrounding the rotor, and an infeed ramp connected to the front concave. The infeed ramp is located at a distance radially away from the rotor and has a plurality of slots therein. The threshing system also includes a support member positioned underneath the infeed ramp and a plurality of vanes connected to the support member. Each vane extends through a respective slot of the plurality of slots and is located at a distance radially away from the rotor. The vanes are configured for contacting and directing the crop material rearwardly towards the front concave.

14 Claims, 3 Drawing Sheets

(51) Int. Cl.
*A01F 7/06* (2006.01)
*A01F 12/10* (2006.01)

(58) Field of Classification Search
USPC .......................................................... 460/107
See application file for complete search history.

(56) References Cited

U.S. PATENT DOCUMENTS

| | | | | |
|---|---|---|---|---|
| 4,711,075 | A * | 12/1987 | Strong | A01F 12/24 |
| | | | | 460/110 |
| 4,900,290 | A | 2/1990 | Tanis | |
| 5,344,367 | A | 9/1994 | Gerber | |
| 6,152,820 | A * | 11/2000 | Heidjann | A01F 12/40 |
| | | | | 460/112 |
| 6,517,431 | B2 * | 2/2003 | Schwersmann | A01F 7/06 |
| | | | | 460/16 |
| 8,926,415 | B2 * | 1/2015 | Farley | A01F 7/067 |
| | | | | 460/107 |
| 9,706,714 | B2 | 7/2017 | Busmann et al. | |
| 2013/0137492 | A1 * | 5/2013 | Biggerstaff | A01F 12/28 |
| | | | | 460/62 |

* cited by examiner

CONCAVE RAMP FOR AN AGRICULTURAL VEHICLE

FIELD OF THE INVENTION

The present invention relates to agricultural vehicles, and, more particularly, to agricultural vehicles with concave ramps.

BACKGROUND OF THE INVENTION

An agricultural harvester known as a "combine" is historically termed such because it combines multiple harvesting functions with a single harvesting unit, such as picking, threshing, separating, and cleaning. A combine includes a header, which removes the crop from a field, and a feeder housing which transports the crop matter to a threshing and cleaning system. The threshing and cleaning system may include a threshing rotor that rotates within a housing and performs a threshing operation on the crop material to remove the grain. The housing may include adjustable concaves with perforations for the grain to pass therethrough. Once the grain is threshed, it falls through the perforations in the concaves onto a grain pan. From the grain pan, the grain is cleaned using the cleaning system, which generally includes one or more sieve(s) and a cleaning fan. The cleaning fan blows air through the sieves to discharge chaff and other debris toward the rear of the combine. The clean grain is then transported to a grain tank onboard the combine via a clean grain auger. Material other than grain (MOG), such as straw, debris, dust, etc., from the threshing section proceeds through a residue system, which may utilize a straw chopper to process the MOG and direct it out through the rear of the combine.

Generally, concaves may be adjustably mounted on one or both sides of the concave frame. Thereby, the clearance passageway for crop material to flow between the concaves and the rotor may be adjusted. In order to adjust the clearance passageway, there exists various concave adjustment assemblies which allow concave adjustments to be made. Such adjustment assemblies typically include a motor in driven relation to a gear train that is in connection with the concaves for moving the concaves radially inward or outward from the rotor.

Within the threshing system of some combines, an infeed ramp, such as a concave ramp, may be included to direct the crop material towards the rotor and concaves. In the direction of crop material flow, the concave ramp is positioned in between the feeder housing and the concaves, and more specifically in between the infeed cone and the first concave. Generally, the concave ramp is fixedly attached to the first concave by way of fasteners or welding. Since the concave ramp is fixed to the first concave, the concave ramp moves radially up or down along with the movement of the front concave. The concave ramp may extend along the entire circumference of the first concave or a portion thereof. Some concave ramps in effect may undesirably create a "V" area in between the first concave and the infeed cone, which directs the crop material flow around the infeed area instead of across the concave ramp and into the concaves. This undesirable flow path created by the concave ramp may increase the horsepower needed to move the crop material through the concave ramp and into the concaves.

What is needed in the art is a cost-effective infeed ramp that is more energy efficient.

SUMMARY OF THE INVENTION

In one exemplary embodiment formed in accordance with the present invention, there is provided a threshing system including a rotor, an infeed ramp that has slots therein, and vanes extending through the slots of the infeed ramp. The infeed ramp is moveable relative to the rotor and the vanes are fixed relative to the rotor. The vanes prohibit crop material from flowing along the length of the inner surface of the infeed ramp and force the crop material to travel across the width of the infeed ramp toward the rotor.

In another exemplary embodiment formed in accordance with the present invention, there is provided an agricultural vehicle including a chassis and a threshing system supported by the chassis. The threshing system includes a rotor, a front concave located at a distance radially away from the rotor and at least partially surrounding the rotor, and an infeed ramp connected to the front concave. The infeed ramp is located at a distance radially away from the rotor and has a plurality of slots therein. The threshing system also includes a support member positioned underneath the infeed ramp and a plurality of vanes connected to the support member. Each vane extends through a respective slot of the plurality of slots and is located at a distance radially away from the rotor. The vanes are configured for contacting and directing the crop material rearwardly towards the front concave.

In another exemplary embodiment formed in accordance with the present invention, there is provided a threshing system for threshing a crop material. The threshing system includes a rotor, a front concave located at a distance radially away from the rotor and at least partially surrounding the rotor, and an infeed ramp connected to the front concave. The infeed ramp is located at a distance radially away from the rotor and has a plurality of slots therein. The threshing system also includes a support member positioned underneath the infeed ramp, and a plurality of vanes connected to the support member. Each vane extends through a respective slot of the plurality of slots and is located at a distance radially away from the rotor. The vanes are configured for contacting and directing the crop material rearwardly towards the front concave.

In yet another exemplary embodiment formed in accordance with the present invention, there is provided a method of operating an agricultural vehicle, including the step of providing a threshing system for threshing a crop material. The threshing system includes a rotor, a front concave located at a distance radially away from the rotor and at least partially surrounding the rotor, and an infeed ramp connected to the front concave. The infeed ramp is located at a distance radially away from the rotor and has a plurality of slots therein. The threshing system also includes a support member positioned underneath the infeed ramp, and a plurality of vanes connected to the support member. Each vane extends through a respective slot of the plurality of slots and is located at a distance radially away from the rotor. The vanes are configured for contacting the crop material. The method also includes the steps of directing a crop material flow by the infeed ramp toward the front concave, stopping the crop material flow, by the plurality of vanes, from spinning along a perimeter of the infeed ramp, and directing the crop material flow, by the plurality of vanes, rearwardly towards the front concave.

One possible advantage of the exemplary embodiment of the threshing system is that the operational life of the threshing system may be extended because the infeed ramp and vanes of the present invention decrease the horsepower required to move the crop material from the infeed ramp toward the rotor and lessen the wear on the various components.

Another possible advantage of the exemplary embodiment of the threshing system is that the infeed ramp provides for increased crop material flow through the rotor and concaves.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
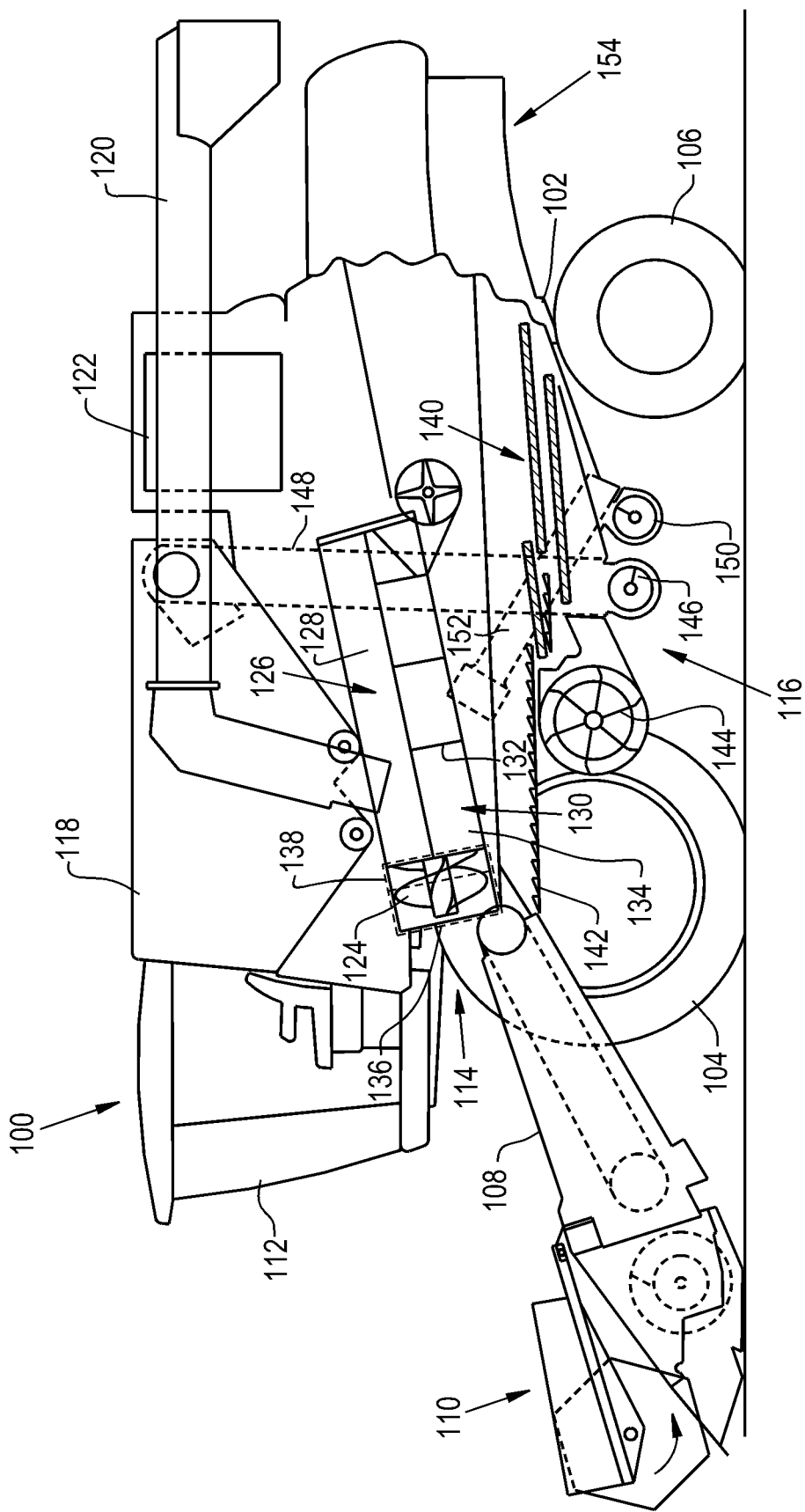
FIG. 1 illustrates a side view of a known agricultural vehicle.

Referring now to the drawings, and more particularly to FIG. 1, there is shown a known agricultural vehicle in the form of a combine 100, which generally includes a chassis 102, ground engaging wheels 104 and 106, a feeder housing 108, a header 110 connected to the feeder housing 108, an operator cab 112, a threshing system 114, a cleaning system 116, a grain tank 118, and an unloading auger 120. Motive force is selectively applied to the front wheels 104 through a prime mover in the form of a diesel engine 122 and a transmission (not shown).

The threshing system 114 is of the axial-flow type, and generally includes a rotor 124, which is rotatable about a longitudinal axis thereof and is at least partially enclosed by and rotatable within a corresponding, cylindrical tube or housing 126. The rotor 124 may include a front portion which is in the form of an infeed impeller. The housing 126 surrounds at least a portion of the rotor 124 and generally includes an upper hemisphere in the form of a rotor shield 128 and a lower hemisphere in the form of one or more concave(s) 130 located at a distance radially away from the rotor 124. In this regard, a gap, e.g. a clearance passage, exists between the rotor 124 and the concave(s) 130 which allows crop material to be threshed therein. Each concave 130 has a concave frame 132 which is configured for receiving and supporting a concave insert 134. Each concave 130 may include a plurality of perforations, apertures, or orifices therethrough for allowing the passage of correspondingly-sized crop material, such as threshed grain and small particles of MOG. The concave(s) 130 may be hingedly and/or rigidly supported relative to rotor shield 128. For example, the concave(s) 130 may be flexibly mounted at the right side of the concave frame(s) 132 and may be rigidly mounted at the left side of the concave frame(s) 130. The concave(s) 130 may be adjusted, e.g. moved radially inward or outward from the rotor 124, via a motor in driven relation to a gear train in order to alter the clearance passage between the rotor 124 and the concave(s) 130.

The threshing system 114 may also include an infeed cone 136 and an infeed ramp 138. The infeed cone 136 may at least partially surround the infeed impeller, and the infeed cone 136 may be fixedly attached to the infeed ramp 138. The infeed ramp 138, for example a concave ramp 138, may be positioned in between the infeed cone 136 and the first concave to which it is fixedly attached by way of fasteners or welding. The infeed ramp 138 may match the contour of the front concave, and the infeed ramp 138 may extend along at least a portion or substantially all of the perimeter of the front concave. Once the crop material exits the feeder housing 108, it may be directed by the infeed cone 136 and the infeed ramp 138 into the clearance passage between the rotor 124 and the concaves 130. The crop material may be helically conveyed from the front to the rear of the housing 126 via the motion of the rotor 124.

The cleaning system 116 generally includes one or more sieve(s) 140, a grain pan 142, and a cleaning fan 144. In operation, the cut crop material which has been threshed and separated by threshing system 114 falls onto the grain pan 142 and the sieve(s) 140. The grain pan 142 and the sieve(s) 140 may oscillate in a fore-to-aft manner to further sift the crop material. The cleaning fan 144 provides an airflow through the sieve(s) 140 to remove chaff and other impurities such as dust from the grain via making this material airborne for discharge out of the rear of the combine 100. After passing through the cleaning system 116, the clean grain falls to a clean grain auger 146 positioned crosswise below and in front of the sieve(s) 140. The clean grain auger 146 conveys the clean grain laterally to a grain elevator 148 for transport to the grain tank 118. Tailings from the cleaning system 116 are transported via a tailings auger 150 and a return auger 152 to the upstream end of the cleaning system 116 for repeated cleaning action. The non-grain crop material proceeds out of the rear of the combine 100 through a residue handling system 154, which may include a chopper, counter knives, a windrow door, and a residue spreader.

Referring now collectively to FIGS. 2-5, there is shown an exemplary embodiment of a threshing system 200 in accordance with the present invention. The threshing system 200 may be incorporated within the agricultural vehicle 100 as described above; thereby, the threshing system 200 may be supported by the chassis 102 of the agricultural vehicle 100. The threshing system 200 is configured for threshing a crop material and generally includes a rotor 202 with a front portion in the form of an infeed impeller 204, an infeed cone 206, one or more concave(s) 210, an infeed ramp 220, a support member 230, and multiple vanes 240.

The rotor 202 may be designed and function as the rotor 124 discussed above. The infeed cone 206 may be designed as the infeed cone 136, and the concave(s) 210 may be designed as the concaves 130 discussed above.

The front concave 210F may be located at a distance radially away from the rotor 202, and the front concave 210F may at least partially surround the rotor 202. As shown by the bidirectional arrow in FIG. 2, the concaves 210, including the front concave 210F, are adjustable so that the concaves 210 may be moved radially inward or outward relative to the rotor 202. The concaves 210 may include a concave adjustment system which includes a motor and gearing as discussed above.

The infeed ramp 220, e.g. a concave ramp 220, may be connected to the front concave 210F and located at a distance radially away from the rotor 202. For example, the infeed ramp 220 may be fixedly attached to the front concave 210F via fasteners or welding. Hence, a movement of the front concave 210F causes a corresponding movement of the infeed ramp 220. The infeed ramp 220 has slots 222 extending through the body thereof. The slots 222 may extend from a front to a rear of the infeed ramp 220 at an angle. For example, the angle of the slots 222 may correspond to the angle of the cage vane angle. Additionally, for example, the angle of the slots 222 may be approximately 35 degrees, plus or minus 10 degrees. The infeed ramp 220 may be composed of any desired material such as metal.

Figure 4:
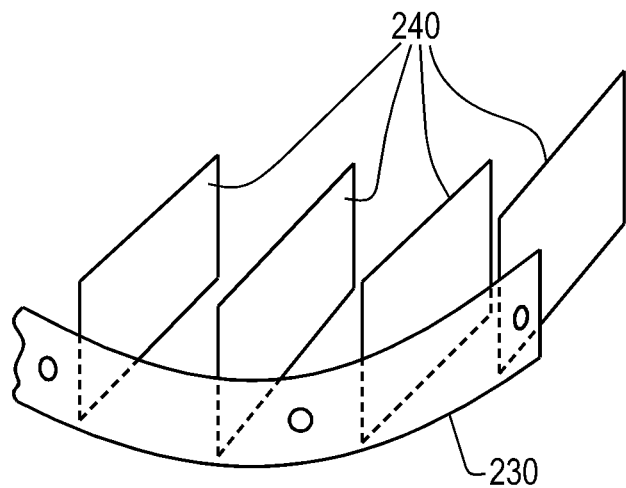
FIG. 4 illustrates a perspective view of the vanes of the threshing system of FIG. 2, in accordance with an exemplary embodiment of the present invention.
Figure 5:
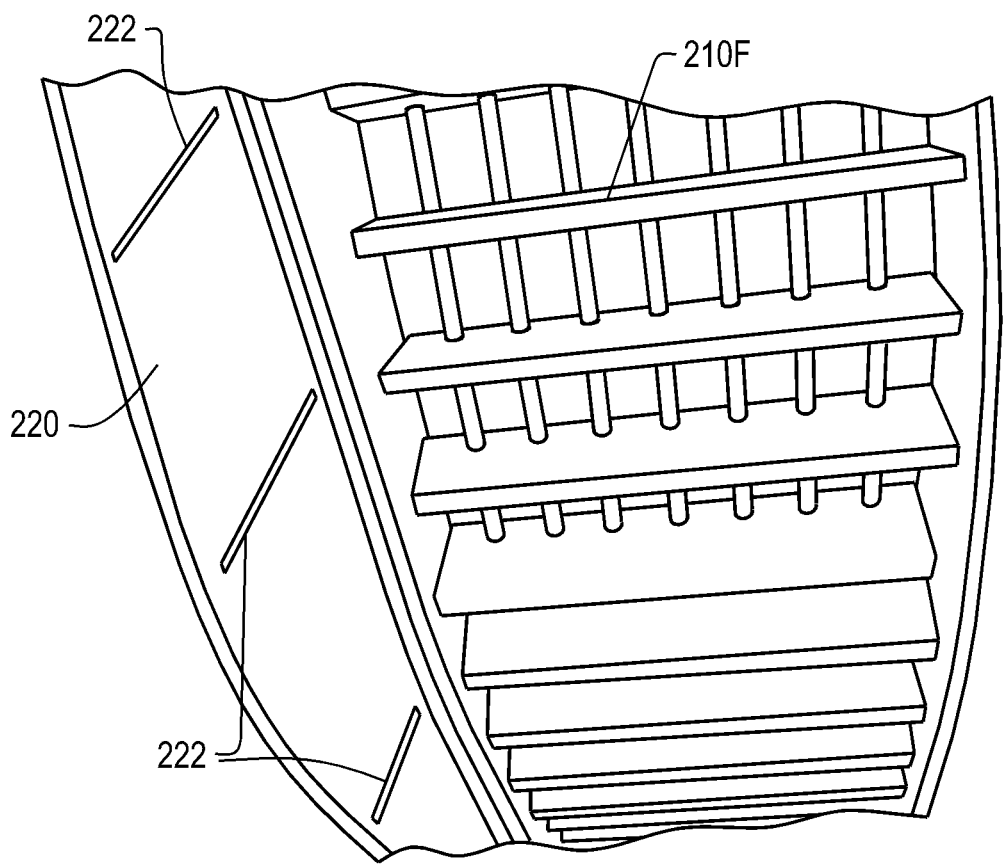
FIG. 5 illustrates a perspective view of the concave ramp and front concave of the threshing system of FIG. 2, in accordance with an exemplary embodiment of the present invention.

The support member 230 is configured to mount and support the vanes 240. The support member 230 may be positioned underneath the infeed ramp 220, and the support member 230 may be positioned at a desired location away from the infeed ramp 220 so that the infeed ramp 220 may be adjusted within a desired range without contacting or otherwise having its movement limited by the support member 230. The support member 230 may be located at a fixed distance from the rotor 202. The support member 230 may contact and support substantially all of the body of each vane or a portion thereof. By way of example only, the support member 230 is shown to contact and support a front portion of each vane 240 in a cantilevered fashion (FIG. 4). The vanes 240 may be secured to the support member 230 by fasteners or welding. The support member 230 may be in the form of a structural support member, such as a metal frame which follows the contour of the rotor 202. The support member 230 may fixedly attach to the front bulkhead or onto another support member near the front bulkhead area. It should also be appreciated that the vanes 240 may be directly attached to the front bulkhead of the combine 100.

Figure 2:
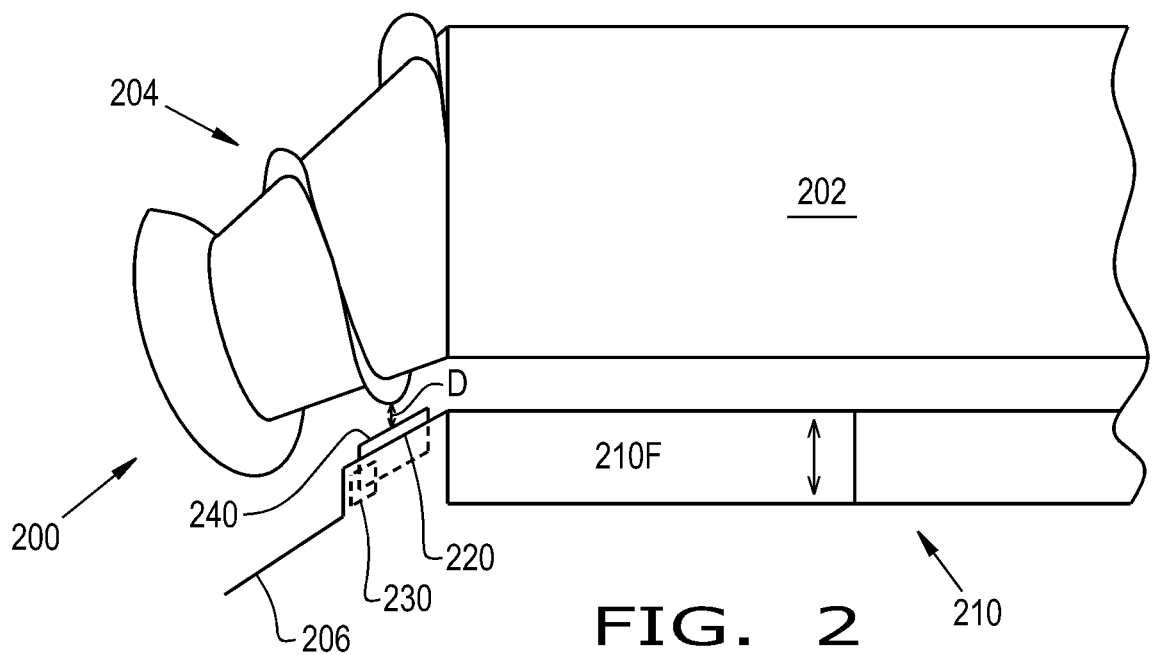
FIG. 2 illustrates a schematic view of an exemplary embodiment of a threshing system including a concave ramp and vanes extending therethrough, in accordance with an exemplary embodiment of the present invention.
Figure 3:
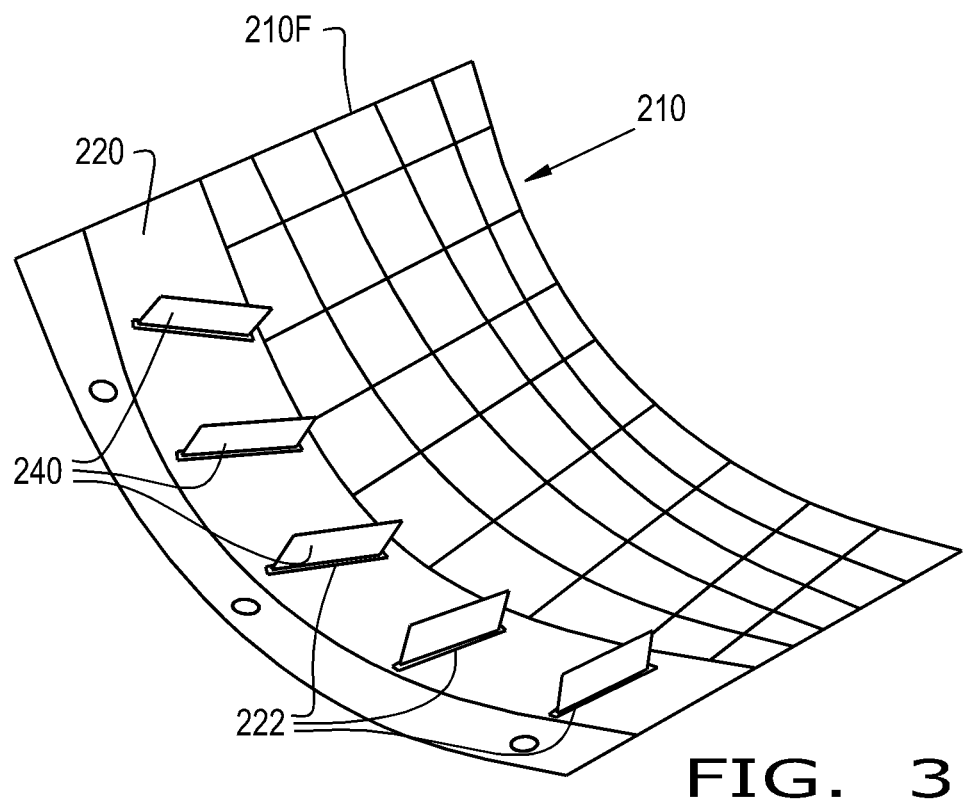
FIG. 3 illustrates a perspective view of the concave ramp and vanes of the threshing system of FIG. 2, in accordance with an exemplary embodiment of the present invention.

The vanes 240 may be connected to the support member 230 and configured for contacting and directing the crop material rearwardly towards the front concave 210F. In more detail, the vanes 240 may be configured for increasing the crop material flow by forcing the crop material rearwardly out of the infeed ramp 220, across the width of the infeed ramp 220, and toward the front concave 210F by stopping the crop material from spinning along a perimeter of the infeed ramp 220, i.e., the curved inner surface along the length of the infeed ramp 220. Each vane 240 extends through a respective slot 222 and is located at a distance D radially away from the rotor 202 (FIG. 2). The distance D may be in a range of 10-30 mm, such as approximately 20 mm, plus or minus 5 mm. Each vane 240 has an angle which corresponds to an angle of each slot 222, respectively. The vanes 240 are fixedly attached to the support member 230 such that the vanes 240 do not move with the movement of the concaves 210 and the infeed ramp 220. In this respect, as the infeed ramp 220 moves relative to the rotor 202, the distance D between each vane 240 and the rotor 202 remains constant so that a clearance passageway between the rotor 202 and each vane 240 for the crop material to pass therebetween remains constant. Thereby, the concaves 210 and the infeed ramp 220 may be desirably adjusted without affecting the clearance passageway between the vanes 240 and the rotor 202. The vanes 240 may be composed of any desired material, such as metal. The vanes 240 are shown to have a cross-section that is rectangular; however, it should be appreciated that the vanes 240 may have a cross-section in the form of any desired shape.

A method for operating an agricultural vehicle is also provided by an exemplary embodiment of the present invention. The method includes the steps of providing a threshing system 200 as discussed above and directing a crop material flow by the infeed ramp 220 toward the front concave 210F. The method also includes the steps of stopping the crop material flow, by the vanes 240, from spinning along a perimeter of the infeed ramp 220, and directing the crop material flow, by the vanes 240, rearwardly across the width of the infeed ramp 220 towards the front concave 210F. The method also includes the step of adjusting a position of the front concave 210F and the infeed ramp 220. The method further includes the step of maintaining the distance between each vane 240 and the rotor 202 such that the clearance passageway between the rotor 202 and the vanes 240 for the crop material to pass therebetween remains constant. In this respect, the vanes 240 will not contact or otherwise interfere with the infeed impeller 204 when the front concave 210F and the infeed ramp 220 are adjusted. Also, the vanes 240 will continue to increase the crop material flow throughout the range of adjustments of the front concave 210F and the infeed ramp 220. Thereby, the vanes 240, and more specifically, the variable relationship between the vanes 240 and the infeed ramp 220 as well as the fixed relationship between the vanes 240 and the rotor 202, achieve a desired crop material flow in which the requisite horsepower is lowered and the wear on the various components of the threshing system 200 is lessened.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
a chassis; and
a threshing system supported by the chassis, configured for threshing a crop material, and including:
   a rotor;
   a front concave located at a distance radially away from the rotor and at least partially surrounding the rotor;
   an infeed ramp connected to the front concave, the infeed ramp located at a distance radially away from the rotor, and the infeed ramp having a plurality of slots therein;
   a support member positioned underneath the infeed ramp; and a plurality of vanes connected to the support member, each of the plurality of vanes extending through a respective slot of the plurality of slots and being located at a distance radially away from the rotor, the plurality of vanes being configured for contacting and directing the crop material rearwardly towards the front concave, wherein the front concave is movable relative to the rotor, and the infeed ramp is fixedly connected to the front concave such that a movement of the front concave causes a corresponding movement of the infeed ramp, and wherein the support member is located at a fixed distance from the rotor, and the plurality of vanes are fixedly connected to the support member.

2. The agricultural vehicle of claim 1, wherein as the infeed ramp moves relative to the rotor, the distance between each of the plurality of vanes and the rotor remains constant such that a clearance passageway between the rotor and the plurality of vanes for the crop material to pass therebetween remains constant.

3. The agricultural vehicle of claim 1, wherein the distance between each of the plurality of vanes and the rotor is approximately 20 mm.

4. The agricultural vehicle of claim 1, wherein each of the plurality of slots extends from a front to a rear of the infeed ramp at an angle, and each of the plurality of vanes has an angle corresponding to the angle of a respective one of the plurality of slots.

5. The agricultural vehicle of claim 1, wherein the plurality of vanes is configured to increase a crop material flow by forcing the crop material rearwardly out of the infeed ramp and toward the front concave and by stopping the crop material from spinning along a perimeter of the infeed ramp.

6. A threshing system configured for threshing a crop material, comprising:
   a rotor;
   a front concave located at a distance radially away from the rotor and at least partially surrounding the rotor;
   an infeed ramp connected to the front concave, the infeed ramp located at a distance radially away from the rotor, and the infeed ramp having a plurality of slots therein;
   a support member positioned underneath the infeed ramp; and
   a plurality of vanes connected to the support member, each of the plurality of vanes extending through a respective slot of the plurality of slots and being located at a distance radially away from the rotor, the plurality of vanes being configured for contacting and directing the crop material rearwardly towards the front concave,
   wherein the front concave is movable relative to the rotor, and the infeed ramp is fixedly connected to the front concave such that a movement of the front concave causes a corresponding movement of the infeed ramp, and
   wherein the support member is located at a fixed distance from the rotor, and the plurality of vanes are fixedly connected to the support member.

7. The threshing system of claim 6, wherein as the infeed ramp moves relative to the rotor, the distance between each of the plurality of vanes and the rotor remains constant such that a clearance passageway between the rotor and the plurality of vanes for the crop material to pass therebetween remains constant.

8. The threshing system of claim 6, wherein the distance between each of the plurality of vanes and the rotor is approximately 20 mm.

9. The threshing system of claim 6, wherein each said slot of the plurality of slots extends from a front to a rear of the infeed ramp at an angle, and each of the plurality of vanes has an angle corresponding to the angle of a respective one of the plurality of slots.

10. The threshing system of claim 6, wherein the plurality of vanes is configured to increase a crop material flow by forcing the crop material rearwardly out of the infeed ramp and toward the front concave and by stopping the crop material from spinning along a perimeter of the infeed ramp.

11. A method of operating an agricultural vehicle comprising a threshing system for threshing a crop material, the threshing system including a rotor, a front concave located at a distance radially away from the rotor and at least partially surrounding the rotor, an infeed ramp connected to the front concave, the infeed ramp located at a distance radially away from the rotor, and the infeed ramp having a plurality of slots therein, a support member positioned underneath the infeed ramp, and a plurality of vanes connected to the support member, each of the plurality of vanes extending through a respective slot of the plurality of slots and being located at a distance radially away from the rotor, the plurality of vanes being configured for contacting the crop material, wherein the front concave is movable relative to the rotor and the infeed ramp is fixedly connected to the front concave such that a movement of the front concave causes a corresponding movement of the infeed ramp, and wherein the support member is located at a fixed distance from the rotor, and the plurality of vanes are fixedly connected to the support member, the method comprising steps of:
   directing a crop material flow by the infeed ramp toward the front concave;
   stopping the crop material flow, by the plurality of vanes, from spinning along a perimeter of the infeed ramp; and
   directing the crop material flow, by the plurality of vanes, rearwardly towards the front concave.

12. The method of claim 11, further including a step of adjusting a position of the front concave and the infeed ramp.

13. The method of claim 12, further including a step of maintaining the distance between each of the plurality of vanes and the rotor such that a clearance passageway between the rotor and the plurality of vanes for the crop material to pass therebetween remains constant.

14. The method of claim 11, wherein each of the plurality of slots extends from a front to a rear of the infeed ramp at an angle, and each of the plurality of vanes has an angle corresponding to the angle of a respective one of the plurality of slots.

* * * * *